N. J. POWELL.
Smoothing Irons.
No. 209,133. Patented Oct. 22, 1878.
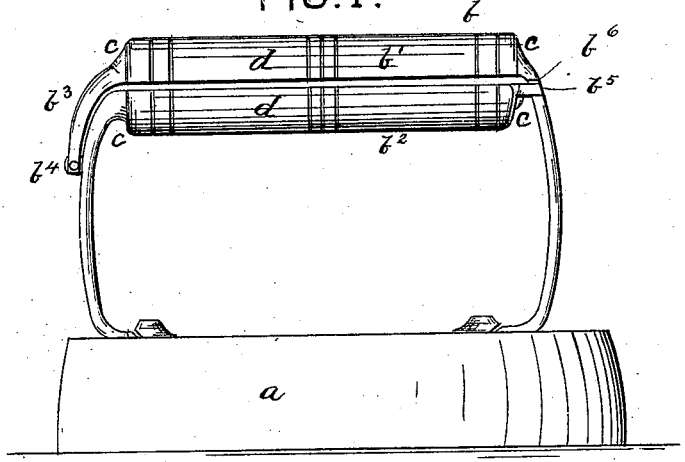
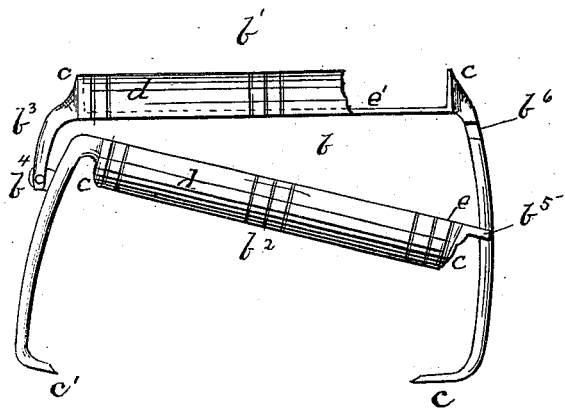
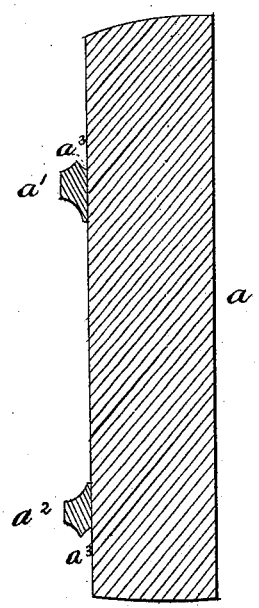
WITNESSES
Saml R. Turner
J. B. Holderby
INVENTOR
Newman J. Powell
By R. S. & A. Lacey
ATTORNEYS

UNITED STATES PATENT OFFICE.

NEWMAN J. POWELL, OF FAIRMONT, NEBRASKA, ASSIGNOR TO HIMSELF, JOHN POWELL, FRANKLIN A. POWELL, AND SUSANNA L. ROBINSON, OF PONTIAC, ILLINOIS.

IMPROVEMENT IN SMOOTHING-IRONS.

Specification forming part of Letters Patent No. 209,133, dated October 22, 1878; application filed August 13, 1878.

*To all whom it may concern:*

Be it known that I, NEWMAN J. POWELL, of Fairmont, in the county of Fillmore and State of Nebraska, have invented certain new and useful Improvements in Smoothing-Irons; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

This invention has for its object to furnish a detachable handle for smoothing-irons, the nature of which will be hereinafter fully explained.

In the drawings, Figure 1 is a side elevation of a smoothing-iron with my approved handle attached thereto. Fig. 2 is a view of the handle; and Fig. 3 is a longitudinal section of the smoothing-iron with the handle detached.

$a$ is the body of the iron. On the top thereof are affixed the bosses or projections $a^1$ $a^2$ in the positions usually occupied by the handles in irons of ordinary construction. On the under side of these bosses there are formed the grooves $a^3$ $a^3$, as shown. $b$ is the handle. It is formed in two parts, $b^1$ $b^2$, which overlap each other, as shown. The upper or outer part, $b^1$, has the extension $b^3$ bent down along the under part, and is hinged thereto at $b^4$, while the under part, $b^2$, has on its free end a small projection, $b^5$, which is adapted to catch in a notch or recess, $b^6$, in the side of the outer part, $b^1$.

On the lower ends of the arms of the handle there are formed the feet $c$ $c'$, which are turned inward and are arranged and adapted to enter the grooves or recesses $a^3$.

The handle being detached, as shown in Fig. 2, the feet $c$ $c'$ are placed in the grooves $a^3$, and the end of the part $b^2$ is pressed upward till the projection $b^5$ catches in the notch $b^6$, which will lock the handle firmly to the iron.

To detach the handle, the end of the part $b^2$ is pressed sidewise till the projection $b^5$ is out of the notch $b^6$, when the said part $b^2$ may be pressed down to the position shown in Fig. 2, and the feet $c$ $c'$ will be detached from the iron.

When the handles of ordinary irons are cut off, grooves $a^3$ may be cut with an ordinary chisel and file under the bosses or small portion of said handle remaining, and the iron can then be rendered serviceable by the use of my improved handle.

The part $b^2$ of the handle $b$ being hinged to and swinging below the part $b^1$ is brought more fully under the control of the hand, and may be manipulated by the fingers with perfect ease. The part $b^1$ being above and stationary gives a substantial rest and support for the heel of the hand, while the fingers are free to open or close the lower half, $b^2$, as hereinbefore explained.

I do not claim, broadly, a handle divided into two parts, which are hinged together and provided with catches or other fastenings; but,

Having thus described my invention, what I claim, and desire to secure by Letters Patent, is—

In a sad-iron, $a$, provided with the projections $a^1$ $a^2$, having cross-grooves $a^3$, the handle $b$, having feet $c$, and composed of the part $b^1$, having notch or recess $b^6$, and part $b^2$, having projection $b^5$, the part $b^2$ being hinged to and swinging below the part $b^1$, substantially as and for the purpose set forth.

In testimony that I claim the foregoing as my own I affix my signature in presence of two witnesses.

NEWMAN J. POWELL.

Witnesses:
 LORENZO D. CUSTAR,
 GEO. COOK.